US007228145B2

(12) United States Patent
Burritt et al.

(10) Patent No.: US 7,228,145 B2
(45) Date of Patent: Jun. 5, 2007

(54) DROPPED CALL CONTINUATION

(75) Inventors: David R. Burritt, Broomfield, CO (US); Elliott Evans, Boulder, CO (US); Robert M. Klein, Denver, CO (US); Joann J. Ordille, Essex, NJ (US); Ravi Sethi, Somerset, NJ (US); Hector Urroz, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 470 days.

(21) Appl. No.: 10/442,617

(22) Filed: May 21, 2003

(65) Prior Publication Data

US 2004/0235509 A1 Nov. 25, 2004

(51) Int. Cl.
*H04B 7/00* (2006.01)
*H04Q 7/20* (2006.01)

(52) U.S. Cl. .................. 455/519; 455/445; 455/422.1; 455/414.1; 455/464; 455/564; 379/157; 379/158; 379/221.15

(58) Field of Classification Search ............... 455/445, 455/436, 422.1, 442, 414.1, 452.1, 464, 564, 455/519; 379/158, 157, 201.01, 142.01, 379/233, 221.15
See application file for complete search history.

(56) References Cited

U.S. PATENT DOCUMENTS

| 5,040,208 | A | 8/1991 | Jolissaint |
| 5,185,782 | A | 2/1993 | Srinivasan |
| 5,566,225 | A | 10/1996 | Haas |
| 5,566,236 | A | 10/1996 | MeLampy et al. |
| 5,664,007 | A * | 9/1997 | Samadi et al. .............. 455/442 |
| 5,752,185 | A | 5/1998 | Ahuja |
| 5,995,830 | A * | 11/1999 | Amin et al. ................ 455/423 |
| 6,032,040 | A | 2/2000 | Choy et al. |
| 6,141,328 | A * | 10/2000 | Nabkel et al. .............. 370/259 |
| 6,275,713 | B1 * | 8/2001 | Toda .......................... 455/564 |
| 6,292,551 | B1 | 9/2001 | Entman et al. |
| 6,445,918 | B1 * | 9/2002 | Hellander .................... 455/423 |
| 6,556,668 | B1 | 4/2003 | Achuthan et al. |

(Continued)

FOREIGN PATENT DOCUMENTS

| EP | 0416803 A2 | 3/1991 |
| WO | WO 98/35482 | 8/1998 |

OTHER PUBLICATIONS

Digital Hot*Desk* User Reference Guide, p. 44, Avaya Inc., 2000.
Product Data Sheet—*Covigo Workflow Server*, Covigo, Inc., 2001, 2 pages.

*Primary Examiner*—Matthew Anderson
*Assistant Examiner*—Sujatha Sharma
(74) *Attorney, Agent, or Firm*—David Volejnicek

(57) ABSTRACT

A switching system adjunct (120) monitors a call between a calling and a called party and reestablishes the call when one of the parties has been or is being dropped. The reestablishment may be effected to a same or a different phone number of the dropped party, and may be effected via the same or a different medium (e.g., wired or wireless). The call record of the original call is merged into the call record of the reestablished call, thus preserving the context of entities involved in the call that exists at the time that the party is dropped.

73 Claims, 6 Drawing Sheets

U.S. PATENT DOCUMENTS

| | | |
|---|---|---|
| 6,603,965 B1 * | 8/2003 | Dinkin ........................ 455/416 |
| 6,633,760 B1 * | 10/2003 | Ham et al. ................ 455/422.1 |
| 6,993,360 B2 * | 1/2006 | Plahte et al. ................. 455/555 |
| 2002/0090947 A1 * | 7/2002 | Brooks et al. ............... 455/436 |
| 2002/0160780 A1 * | 10/2002 | Mukerjee et al. ........... 455/445 |
| 2003/0207689 A1 * | 11/2003 | Roberts et al. .............. 455/445 |
| 2004/0198366 A1 * | 10/2004 | Crocker et al. ........... 455/452.1 |
| 2004/0203645 A1 * | 10/2004 | Forman et al. ........... 455/414.1 |
| 2005/0048981 A1 * | 3/2005 | Anupam et al. ............. 455/445 |
| 2005/0070286 A1 * | 3/2005 | Awasthi et al. .............. 455/436 |

\* cited by examiner

DROPPED CALL CONTINUATION

TECHNICAL FIELD

This invention relates to communications systems in general and to wireless communication systems in particular.

BACKGROUND OF THE INVENTION

Communications switching systems—such as private branch exchanges (PBXs), for instance—provide a variety of call-hold, transfer, and conferencing features to their users. Some also offer a feature where a user can call the PBX from an external (e.g., public network) phone and then use the PBX facilities to make internal or external calls, usually in order to reduce toll charges.

When users' telephones are wireline phones, there is no danger, and hence no expectation, that calls will be dropped due to lost signal strength, although calls may be dropped for other reasons. That is not the case with wireless phones, however. In the case of wireless phones, a user's access to the various system features is dependent on the radio signal remaining strong enough to maintain the call connection. When signal strength deteriorates below some threshold, the connection is dropped at one end and the call is lost. In some systems and under certain circumstances, a wireless phone may attempt to reestablish a dropped connection. However, the connection is usually reestablished as a new call and not as a continuation of the prior call. Likewise, a wireline call may establish a new call in place of a dropped call.

The Digital HotDesk by Avaya Inc. is a private branch exchange (PBX) application that extends PBX-like functionality to off-net telephony endpoints such as cellular phones. It has a cellular cut-off feature wherein, when the caller has the feature enabled in his or her profile and the call terminates at a called mobile location, Digital HotDesk monitors the state of a call, and will try to ascertain whether a Cellular Cut-Off of the called party has occurred during a conversation. It does this by waiting a specified period of time after the called party has cleared down, when the caller is still holding on the call. If the time period is exceeded, the fact that the call was cut off is logged in the call billing record and HotDesk automatically places a call back to the called party at the number that the called party disconnected from, and plays a voice message to the caller to inform him or her that the HotDesk is trying to reconnect the call. The system will try the called party for a given time period, before placing the caller either in caller options or in the called party's mailbox. When a call that has been cut-off is presented back to the called user, it is announced like any other HotDesk call. If a reconnection is established, it is given a new call billing record but the same call handle as the cut-off call so that the two calls can be linked. For HotDesk users participating in conference calls on their mobile phones with Cellular Cut-Off enabled, if the user wants to leave the call prior to the end of the conference, the system will see the user hanging-up as a Cellular Cut-Off, and try and re-connect the call while playing a prompt to the remaining conference participants. The call will then either be answered by the user or by voice mail. It is therefore recommended that users likely to participate in conference calls from their mobile phone have the Cellular Cut-Off feature disabled.

While going a long way to solve the problem of dropped calls, the Cellular Cut-Off feature is limited in its capabilities, restoring calls only to called parties at the called numbers. For example, it works only for called parties and not for calling parties; it cannot change the phone number or the medium of the connection that is reestablished to the called party; and it does not preserve the context of the call.

SUMMARY OF THE INVENTION

This invention is directed to solving these and other problems and disadvantages of the prior art. According to a first aspect of the invention, a dropped portion of an existing communication (e.g., a phone call) is reestablished as follows. Terminal translations of a communication terminal of one of a first party and a second party are associated with a communication virtual terminal, and the communication virtual terminal is associated with a first communication connection between the first party and the second party, illustratively when a call is being initiated between the parties. When it is detected that the first party is (e.g., has been or is being) dropped from the first connection, a second communication connection is established between the first party and the virtual terminal, and the first and the second communication connections are combined to reestablished between the first party and the virtual terminal, and the first and the second communication connections are combined to reestablish a communication connection between the first party and the second party, and contents of a call record of the first connection are associated with the reestablished connection.

According to another aspect of the invention, a dropped portion of an existing communication is reestablished as follows. Terminal translations of a communication terminal of one of a first party and a second party are associated with a communication virtual terminal, a first communication connection is established between the first party and the communication virtual terminal, a second communication connection is established between the virtual terminal and the second party, the first and the second connections are combined to establish a third communication connection between the first and the second parties, and the third connection is monitored by the virtual terminal. When it is detected that one of the first and second parties is dropped from the third connection, a fourth communication connection between the virtual terminal and the one party is established, the fourth connection is combined with the connection between the virtual terminal and the other of the first and the second parties to reestablish a communication connection between the first and the second parties, and contents of the call record of the third connection are associated with the reestablished connection.

According to yet another aspect of the invention, when it is detected that both parties dropped from a communication that has a corresponding "persistent connection" feature active, the communication is reestablished to both parties.

Illustratively, the initial connection and the reestablished connection to the dropped party are made to different call addresses of the dropped party, and the call addresses need not be of the same type; for example, one may be the wireless phone number and the other may be the wired phone number of the party. Also illustratively, the call record of the existing communication connection may comprise a context of one of the parties, which context is automatically restored upon reestablishment of the call. Illustratively, detection that the existing communication connection is being dropped may be effected by receiving signaling to that effect from the party that is being dropped. That is, dropping of the party may be intentionally and actively initiated. This signaling may be originated either automatically by the communications terminal of the dropped party or manually by the dropped party by manipulating (e.g., entering a code by pressing keys) on his or her communications terminal. Also illustratively, the reestablishment of the dropped portion of the existing communication connection may be initiated by one of the parties calling a monitoring entity, and in response having the communication connection established to the one of the parties through the monitoring entity, whereupon the detecting that a party is dropped from the existing communication connection is effected by the monitoring entity.

Advantageous illustrative uses of the invention include:
continuing disconnected business calls and other important interactions despite service discontinuities,
keeping a place in queue at a customer contact center despite temporary disconnection,
maintaining the context of a call in progress at an interactive voice response system despite temporary disconnection,
reaching out to callers when requested or awaited services or resources become available, and
minimizing the effort involved in reconnecting dropped calls.

The illustrative embodiment of the invention described below leverages hold and transfer or conferencing features of a private branch exchange to provide a simple mechanism for effecting call continuation. It also optionally provides value-added services such as transfer of the remaining call participant(s) to voice mail or to a third party, or callback upon the dropped party reaching the head of a call-center queue.

While the invention has been characterized in terms of method, it also encompasses apparatus that performs the method. The apparatus preferably includes an effector—any entity that effects the corresponding step, unlike a means— for each step. The invention further encompasses any computer-readable medium containing instructions which, when executed in a computer, cause the computer to perform the method steps.

BRIEF DESCRIPTION OF THE DRAWING

These and other features and advantages of the invention will become more apparent from the following description of illustrative embodiments of the invention considered together with the drawing wherein.

DETAILED DESCRIPTION

Figure 1:
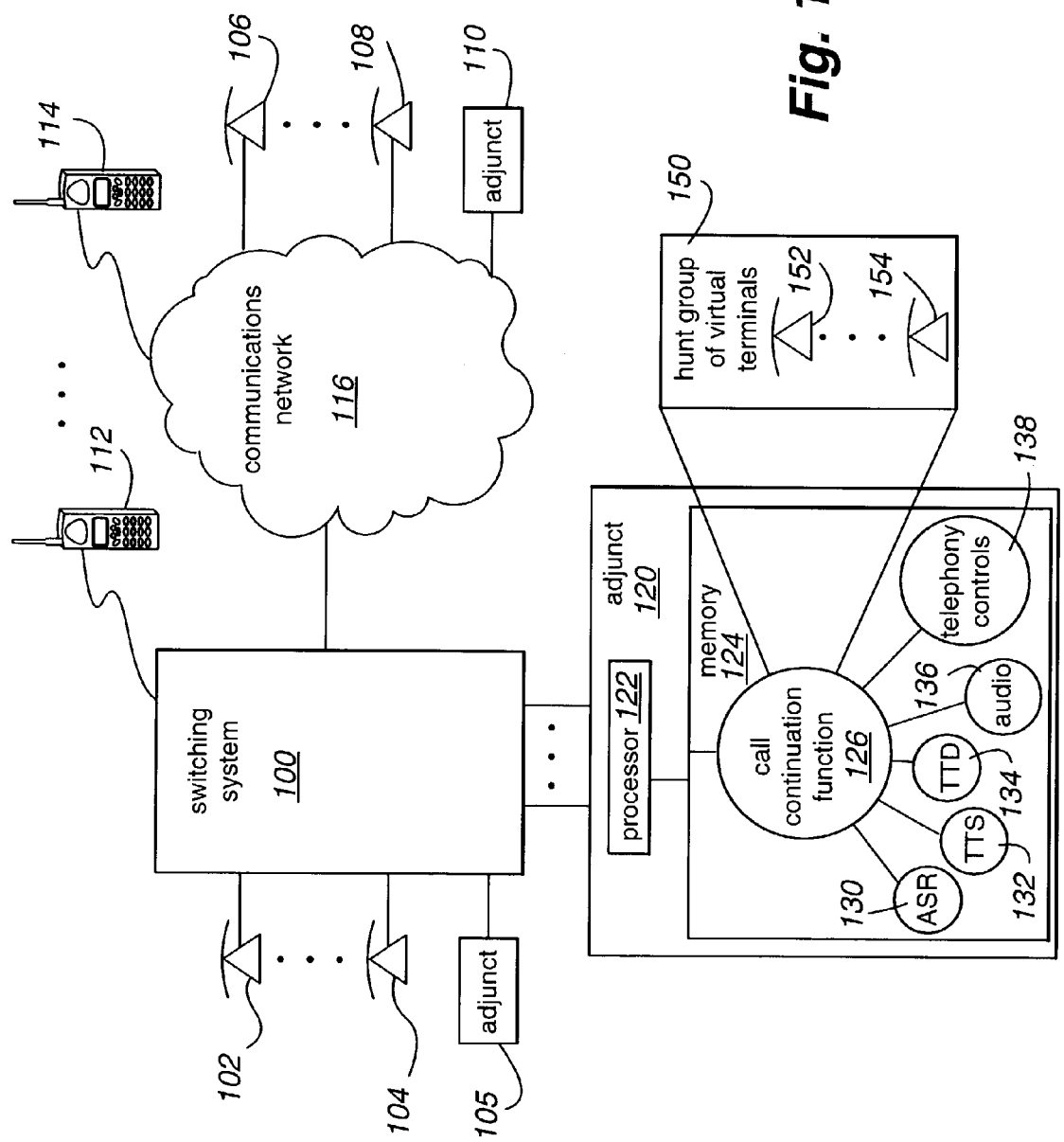
FIG. 1 is a block diagram of a communications system that includes an illustrative embodiment of the invention.

FIG. 1 shows an illustrative communications system that includes an illustrative embodiment of the invention. The communications system comprises a communications switching system 100, such as a local central office switch or a PBX, connected to a communications network 116, such as the public service telephone network and/or the Internet. Both switching system 100 and communications network 116 are connected to wired communications terminals 102-105 and 106-110, respectively, be they user terminals such as telephones or personal computers, or adjuncts such as messaging systems, interactive voice response systems, or customer contact centers (e.g., call centers), running communications software. System 100 and network 116 provide communications services to terminals 102-104 and 106-110. System 100 and network 116 also communicate with and provide services to wireless communications terminals 112-114, such as cell phones or personal digital assistants. Some wireless terminals 112-114 may be served only by their "home" switching system 100, while others may "roam" and be served by whatever portion of network 116 that provides wireless services is closest to them at any one time. As described so far, the communications system of FIG. 1 is conventional.

The communications system of FIG. 1 additionally includes an adjunct processor 120 that is connected to switching system 100. Adjunct processor 120 is a stored-program controlled machine, such as a workstation that includes a memory 124 or any other suitable computer-readable storage medium that stores programs and data, and a processor 122 that executes programs out of memory 124 and stores and retrieves data to and from memory 124. Included among programs that are stored in memory 124 are various service functions 130-138 such as automatic speech recognition (ASR) 130, text-to-speech conversion (TTS) 132, Touch-Tone detection (TTD) 134, audio generation and coding (audio) 136, and telephony controls 138 such as H.234, SIP, or TSAPI. As described so far, adjunct processor 120 is also conventional. It is illustratively the Avaya Conversant® interactive voice response (IVR) system. Alternatively, if switching system 100 is a stored-program-controlled machine such as an Avaya Definity® PBX, adjunct processor 120 may be dispensed with and its functionality may be implemented directly in the switching system, with the processor and the memory or some other computer-readable storage device of switching system 100 taking the place of the processor and memory of adjunct processor 120.

According to the invention, also included among the programs stored in memory 124 is a call-continuation function 126. Function 126 provides reestablishment of connections (portions of existing communications) and continuation of the existing communications that are dropped and lost for some undesired reason, such as degradation or loss of the radio signal on a wireless call, for example. Function 126 uses service functions 130-138 in the process. Function 126 also leverages the hold, transfer, and/or conferencing features of switching system 100 to provide the continuation-of-communications capability. Function 126 implements a hunt group 150 of virtual communication terminals 152-154. Virtual terminals 152-154 are used to represent, or emulate, physical communications terminals during calls in order to effect reestablishment of dropped connections and continuation of lost calls, as described further below. Each virtual terminal 152-154 is implemented as a data structure to which an instance of function 126 can attach.

Call-continuation function 126 may be invoked either by a user of one of terminals 102-105 and 106-114 or by switching system 100, either to the same address (e.g., a phone number) or to a different address of the dropped party. In user-initiated invocation, the user reestablishes the call connection via the same wireless service as carried the call previously, via a different wireless service, or via a wireline telephone. Terminals 102-104 and 106-114 may be programmed to invoke function 126 either by the user actuating a dedicated actuator (e.g., a user pushing a dedicated button) of the terminal, or by entering an alphanumeric (e.g., a 2-digit) code. Terminals 102-114 can also invoke function 126 automatically in response to detected conditions. In switch-initiated invocation, switching system 100 calls the user either at the disconnected terminal or at another, pre-designated, terminal at intervals for some period of time in an attempt to reestablish the call.

Switching system 100 maintains the call to the other (not-dropped) call participant or participants while it either awaits reconnection by the dropped party or attempts to reconnect to the dropped party. The other participant may be either another user or a service, such as IVR (e.g., voice mail). If the dropped party was interacting with an IVR service or was waiting in a call queue for an agent when the connection was dropped, the context of the party is maintained throughout the disconnection and reestablishment. If the party was interacting with one other participant, that participant is asked whether they wish to remain on hold in anticipation of reconnection, or if they prefer to connect to some other entity, e.g., leave a voice-mail message in the dropped party's mailbox. If the dropped party was interacting with multiple other participants on a conference call, the participants may continue their conference and optionally may record it for later delivery to the dropped party. Or, the participants may either wait on hold for the dropped party to reconnect, or leave a voice-mail message for the dropped party and then disconnect the dropped party from the conference.

A user of a wireless phone 112-114 may be able to anticipate the failure of the connection, either through perceived degradation in the quality-of-service of the call or upon entry into a known dead-service area. In this case, the user can ask the other party or parties to the call to wait while the user reconnects. A message asking the other party or parties to hold can be played out or not as a configured option of the user.

In the presence of TTD 134 to collect and interpret in-band signals from the terminals that are entered as alphanumeric codes on the terminals, the following applications may be provided:

The user may actively place a call on hold in anticipation of a lost connection.

The user may actively transfer a wireless phone call to another wired, wireless, Bluetooth, IP phone, etc., to improve the quality, security, or cost of the call.

The user may actively conference in another phone that uses a different service provider and then switch to using that phone to continue the call almost seamlessly. This option may be implemented in a wireless phone that can simultaneously access multiple wireless networks (or a wireless and a Bluetooth network) and change the call provider at the request of the user.

The user may access any of the hold, transfer, conferencing, and other services available to switching system users through the in-band signaling.

If facilities exist in the user's terminal to simultaneously support a voice and a data connection, then the data connection can be used to provide out-of-band signaling and all the applications listed above for in-band signaling can be performed via out-of-band signaling.

Various system facilities can also be added to allow adjunct 120 to provide new connections proactively to improve a wireless user's quality of service. These facilities include the ability to monitor the quality of service of a wireless phone connection, or to obtain the location of the wireless phone. With this information, adjunct 120 can predict when the quality of service of the call will degrade, based on past experience. If such a prediction capability is provided, then the following application is also possible:

When adjunct 120 detects quality of service below a certain threshold or anticipates a dropped call, it initiates a new call to the user via an alternate wireless service provider. Switching system 100 optionally conferences the two calls together. The user can then change to the higher quality call and discontinue the lower-quality call at the user's discretion, and seamlessly in the case of the conferenced calls. The technique works best with a wireless phone that can simultaneously access multiple wireless networks and assist the user in managing the transition between calls.

The call-continuation function illustratively proceeds as follows: A phone user calls adjunct 120 and causes it to place an outgoing call to another person or terminal (another party). After placing the call, adjunct 120 monitors the call. If and when the call connection to one of the parties is dropped, adjunct 120 causes switching system 100 to maintain the connection to the other party and waits to determine if the other party hangs up. If the other party does not hang up, adjunct 120 asks the party to hold for reconnection (reestablishment of the call) and may offer additional service options such as transfer to voice mail or to a third party.

Call reestablishment may be initiated either by the dropped party or by adjunct 120. The dropped phone user initiates a reconnection attempt by calling a special number on switching system 100 via the same wireless service, another wireless service, or a wired phone—that is, either from the same phone number as in the original call connection or from a different phone number. In response, or if adjunct 120 is initiating the reconnection attempt, adjunct 120 causes switching system 100 to reconnect the dropped phone user to the other party or informs the user of the disposition of the call. In reconnecting the call, switching system 100 can use its pre-existing facilities for splicing, transferring, or conferencing calls as appropriate. Caller ID can be used to make the reconnection seamless from any phones owned by the wireless phone user. Authentication is done for a phone user who calls from a public or an unknown phone. The phone user may also be given choices at configuration or reconnection time about what services to offer to the other party who may wait for reconnection (e.g., hold, voice mail, transfer).

Incoming calls to the phone user can be handled in a similar way. A caller calls a number on switching system 100, and switching system automatically connects the call to the called destination. Adjunct 120 then monitors the call and performs the functions described above for calls initiated by the phone user.

Another example of how call-continuation may proceed involves a switching system 100 for customer-relationship management, IVR, or call center application. When a phone user calls switching system 100 for these services, adjunct 120 collects callback information from automatic caller ID, from the caller, or from a database of callback information for the particular caller. If the phone call is dropped, switching system 100 maintains the context of the call and attempts to reconnect to the phone user by using the callback information. Switching system 100 and its associated applications may maintain the location of the user in queue and call the user back when it is the user's turn for service. The user may need to authenticate itself with switching system 100 or the call center, as appropriate, before being restored to its in-queue position.

Another example of how call-continuation may proceed specifically involves a switching system in a wireless network. Every wireless phone has a home switching system that provides these services. The wireless phone user might place and receive all calls through this switching system, or dropped calls might be transferred to this switching system to await a reconnection attempt. In the case where all calls are placed through the user's home switching system, the switching system can be identical to the switching system described above. In a more complex example, the wireless network would hold the call open on the switching system that experienced the disconnection. In this case, the wireless network would locate the call for the reconnecting wireless phone user by going back to an edge switch for the last known location of the wireless phone. In all cases, the wireless phone user would resume the call as before by calling a special number that provides access to the switching system that reconnects the call.

The operation of call continuation function 126 will now be described in greater detail, in conjunction with FIGS. 2-6.

Figure 2:
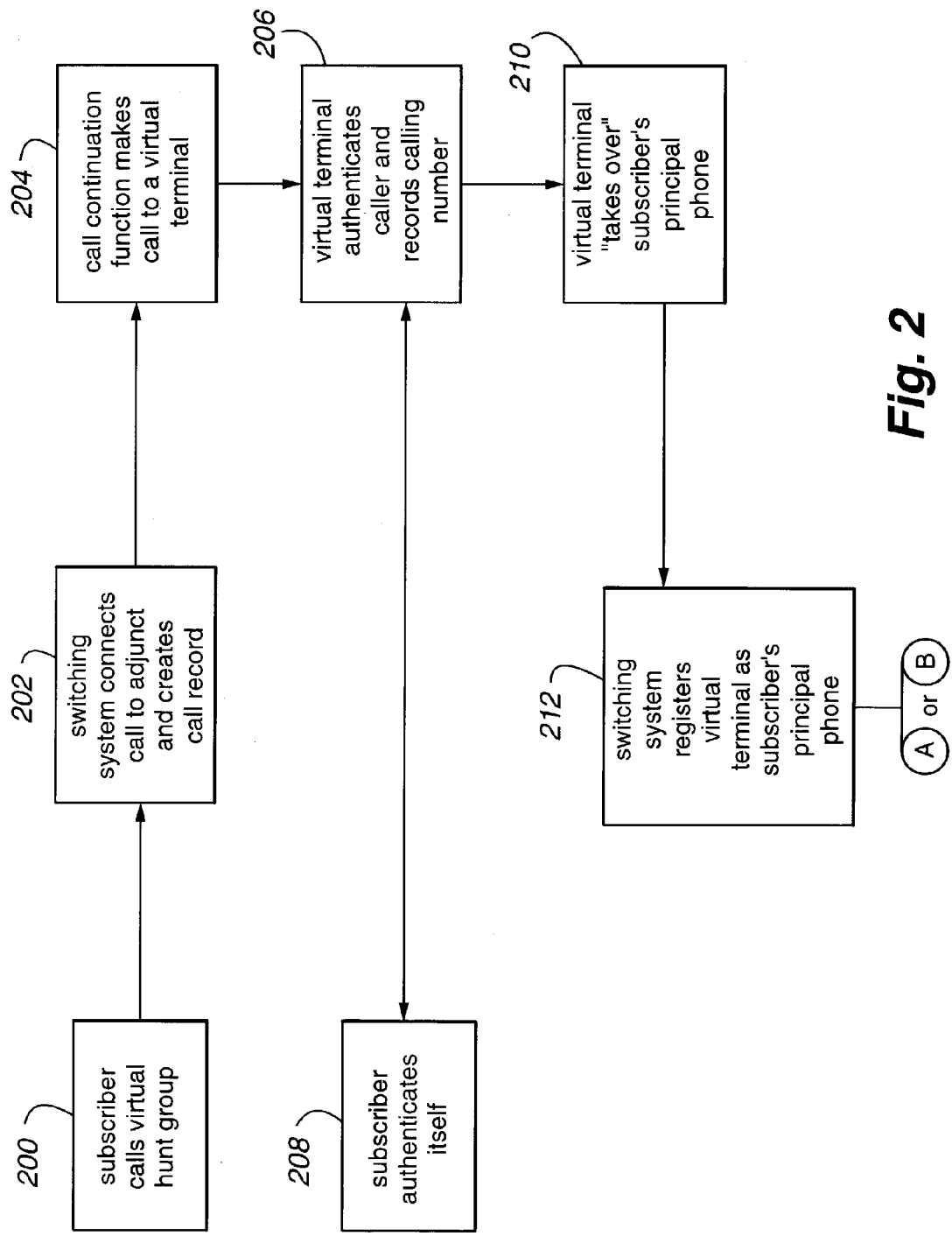
FIG. 2 is a functional block diagram of activation of a call-continuation function of the system of FIG. 1.

The scenario begins with a subscriber of the call-continuation service provided by function 126 calling a telephone number that is assigned to virtual hunt group 150, at step 200 of FIG. 2. The subscriber may place the call from any wired or wireless terminal 102-114. In response, the call is routed to switching system 100, either directly if the call is made on a terminal 102-104 or 112 that is directly connected to switching system 100, or indirectly through communications network 116 if the call is made on a terminal 106-108 or 114, as is conventional. In response, switching system 100 routes the call to adjunct 120 and creates a call record for the call, at step 202. Function 126 of adjunct 120 responds to receipt of the call by mapping it to (associating it with) one of virtual terminals 152-154 of hunt group 150, at step 204. An instance of function 126 that is associated with the mapped virtual terminal 152-154 henceforth acts on behalf of the subscriber, and is henceforth referred to as the mapped virtual terminal performing the action. The mapped virtual terminal answers the call and communicates with the subscriber over the call, at steps 206 and 208, to authenticate the subscriber as being entitled to services of function 126 and to determine and record the number from which the subscriber is calling. Authentication is akin to a login procedure on a computer and may involve the mapped virtual terminal prompting the subscriber to provide his or her personal telephone number and password ID. Determining the calling number may be done automatically, e.g., via ANI, or by prompting the subscriber to enter the number from which the subscriber is calling. The calling number is remembered by the mapped virtual terminal. Upon authentication of the subscriber, the mapped virtual terminal "takes over" the user's principal phone 102-104 on switching system 100, at step 210. The user's principal phone 102-104 need not be a physical phone, but may itself be a virtual phone such as a "phantom" phone on an Avaya Definity® PBX—that is, a set of switch terminal translations that is associated with the subscriber's personal phone number in a translations database of switching system 100. The translations determine, inter alia, the physical port of switching system 100 that is associated with the subscriber's telephone number, the types of services that the subscriber is entitled to, and the billing arrangements for that subscriber. The "take-over" involves the mapped virtual terminal commanding switching system 100 to associate the terminal translations of the subscriber's principal phone with the physical port of switching system 100 that corresponds to the mapped virtual terminal. Switching system 100 responds to the command by doing so, at step 212, thus causing the mapped virtual telephone to become a virtual embodiment of the subscriber's principal phone. Further action depends on whether the subscriber wishes to invoke function 126 for an outgoing call or for incoming calls.

Figure 3:
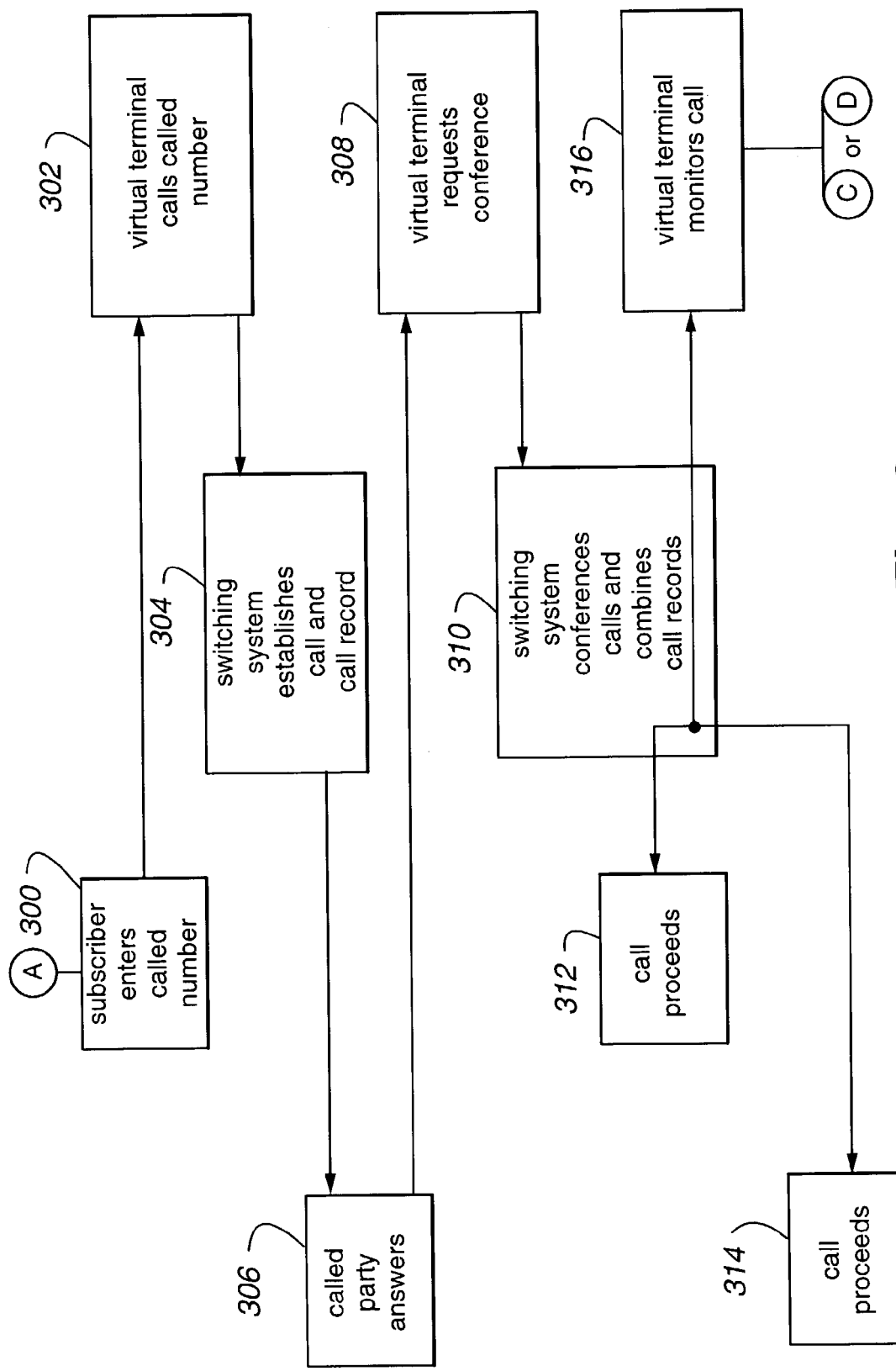
FIG. 3 is a functional block diagram of invocation of call continuation for outgoing calls.

If function 126 is being invoked for an outgoing call, the subscriber enters the number that he or she wishes to call, at step 300 of FIG. 3. The subscriber may do so in response to the mapped virtual terminal prompting the user to enter either a called number or a code indicating that function 126 is being invoked for outgoing calls. The mapped virtual terminal receives the called number and calls that number, at step 302, causing switching system 100 to establish a call between the mapped one of the virtual terminals 152-154 and the called terminal as well as a call record for the call, at step 304. The called terminal may again be any wired or wireless terminal 102-114. It may also be a hunt group, such as an automated call distribution (ACD) skill/split. There are now two calls connected to the mapped virtual terminal 152-154: the first call from the subscriber to the mapped virtual terminal, and the second call from the mapped virtual terminal to the called party. When the called party answers the call, at step 306, the mapped virtual terminal detects the answer and commands switching system 100 to connect together (e.g., conference) the two calls into one call, at step 308. Switching system does so and combines the two calls' call records into one, at step 310. The conferenced calls now form two legs of a single, conference, call that connects the calling and called parties, and this call proceeds between them, at steps 312-314. Being a part of the conference, the mapped virtual terminal 152-154 monitors the conference call, at step 316. If desired, additional parties may now be conferenced into the call.

Figure 4:
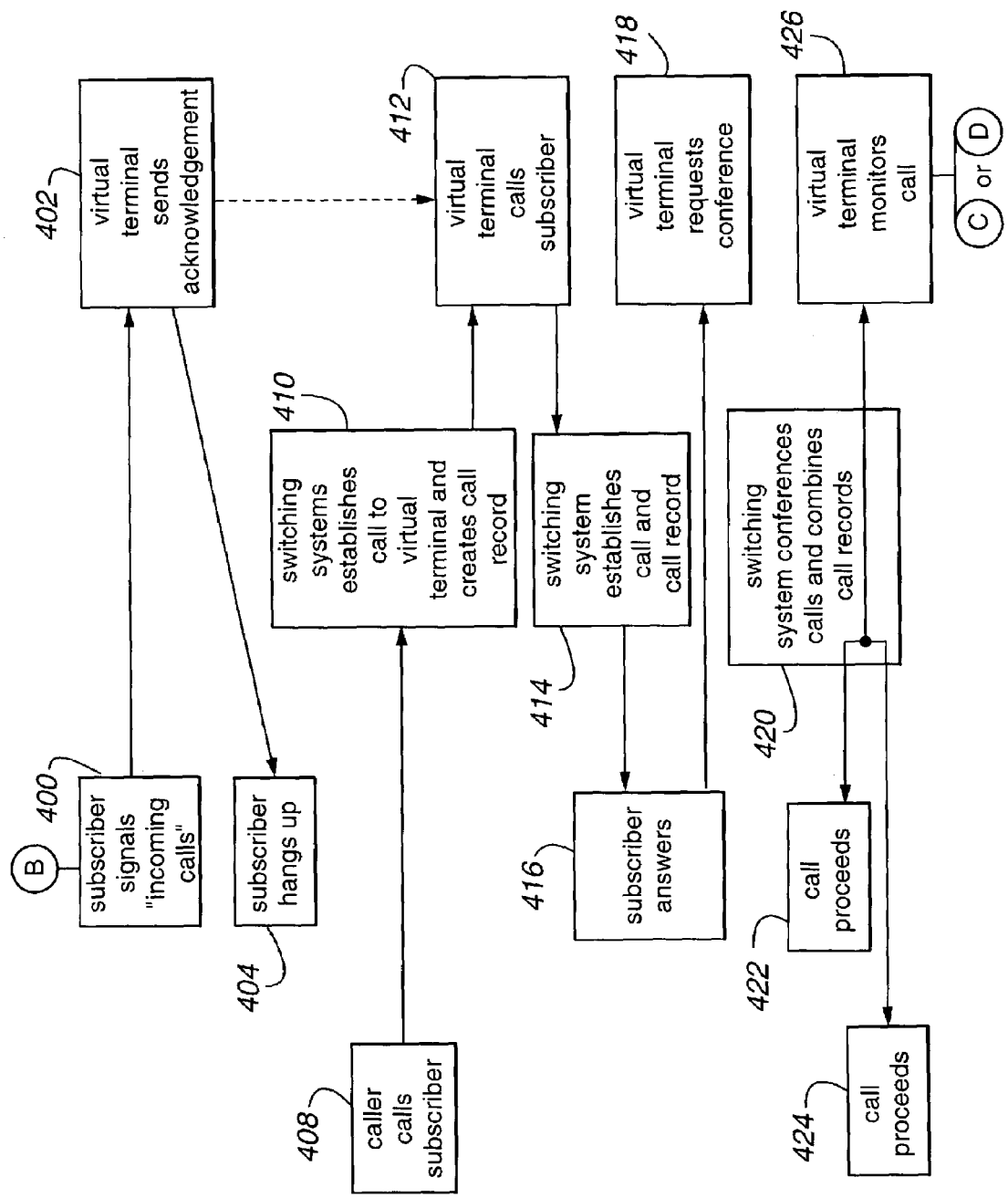
FIG. 4 is a functional block diagram of invocation of call continuation for incoming calls.

If function 126 is being invoked for incoming calls, the subscriber enters a code to that effect, at step 400 of FIG. 4. The mapped virtual terminal receives the code and returns an acknowledgement to the subscriber, at step 402. The subscriber then hangs up the call, at step 404. When a caller calls the subscriber's personal number, at step 408, switching system 100 connects the call to adjunct 120 and creates a call record for the call, at step 410. The virtual terminal 152-154 that is mapped to the subscriber retrieves the subscriber's telephone number which it stored at step 206 of FIG. 2 and calls the subscriber at that number, at step 412. Switching system 100 establishes the call to the subscriber and creates a call record therefor, at step 414. When the subscriber answers, at step 416, there are two calls connected to the mapped virtual terminal 152-154; the first call from the calling party to the mapped virtual terminal, and the second call from the mapped virtual terminal to the subscriber. The mapped virtual terminal detects the subscriber's answer and commands switching system 100 to combine (e.g., conference) the two calls into one, at step 418. Switching system 100 does so and combines the calls' two call records into one, at step 420. The conferenced calls now form two legs of a single, conference, call that connects the calling party and the subscriber, and this call proceeds between the two parties, at steps 422 and 424. Being a part of the conference, the mapped one of the virtual terminals 152-154 monitors the conference call, at step 426. If desired, additional parties now may be conferenced into the call.

The call connection of either party—that is, either party's leg of the conference call—may be dropped, either inadvertently or intentionally. Either party to the call may detect that its call connection is about to be dropped and signal the mapped virtual terminal to that effect. Since the mapped virtual terminal is monitoring the conference call, at step 316 of FIG. 3 or step 426 of FIG. 4, it detects either that one of the parties has been dropped or the signaling indicating that one of the parties is about to be dropped. If the mapped virtual terminal detects that the non-subscriber party has been or is being dropped from the conference call but that the subscriber party has stayed on the call (has not hung up), at step 500 of FIG. 5, it causes switching system 100 to drop the non-subscriber's leg of the conference call if it has not been dropped already, at step 502, and switching system 100 does so, at step 504. The mapped virtual terminal then informs the subscriber that the other party has been dropped and queries the subscriber for whether the connection with the dropped party should be reestablished, at step 504.

Optionally, the mapped virtual terminal may also offer other options to the subscriber at step 504. For example, if the conference call involves more than two parties, the remaining conference participants may choose to continue the conference while having adjunct 120 record it, either instead of attempting to reconnect with the dropped party or in case the dropped party is not reconnected, and they may send the recording to the dropped party's voicemail mailbox if the dropped party does not get reconnected.

If the subscriber responds by hanging up, at step 506, the mapped virtual terminal proceeds to end the call, in a conventional manner, at step 510. If the subscriber signals a desire to have the call reestablished, at step 508, the mapped virtual terminal calls the dropped party, at step 512, either at the number at which the dropped party had been called at step 302 of FIG. 3 or at the number from which the dropped party had called at step 408 of FIG. 4. Switching system 100 establishes the call and a call record therefor, at step 514. If and when the called (previously dropped) party answers, at step 516, the mapped virtual terminal informs the called party that this is a reestablishment of the previous call, at step 518. There are now two calls connected to the mapped virtual terminal 152-154: the first call between the subscriber and the mapped virtual terminal, and the second call from the mapped virtual terminal to the called (previously dropped) party. The mapped virtual terminal now commands switching system 100 to combine (e.g., conference) the two calls into one, at step 520. Switching system 100 does so and combines the two calls' call records into one, at step 522. The conferenced calls again form two legs of a single conference call that connects the two parties, and this call proceeds between them, at step 524 and 526. Being a part of the conference, the mapped virtual terminal 152-154 monitors the conference call, at step 530.

Figure 6:
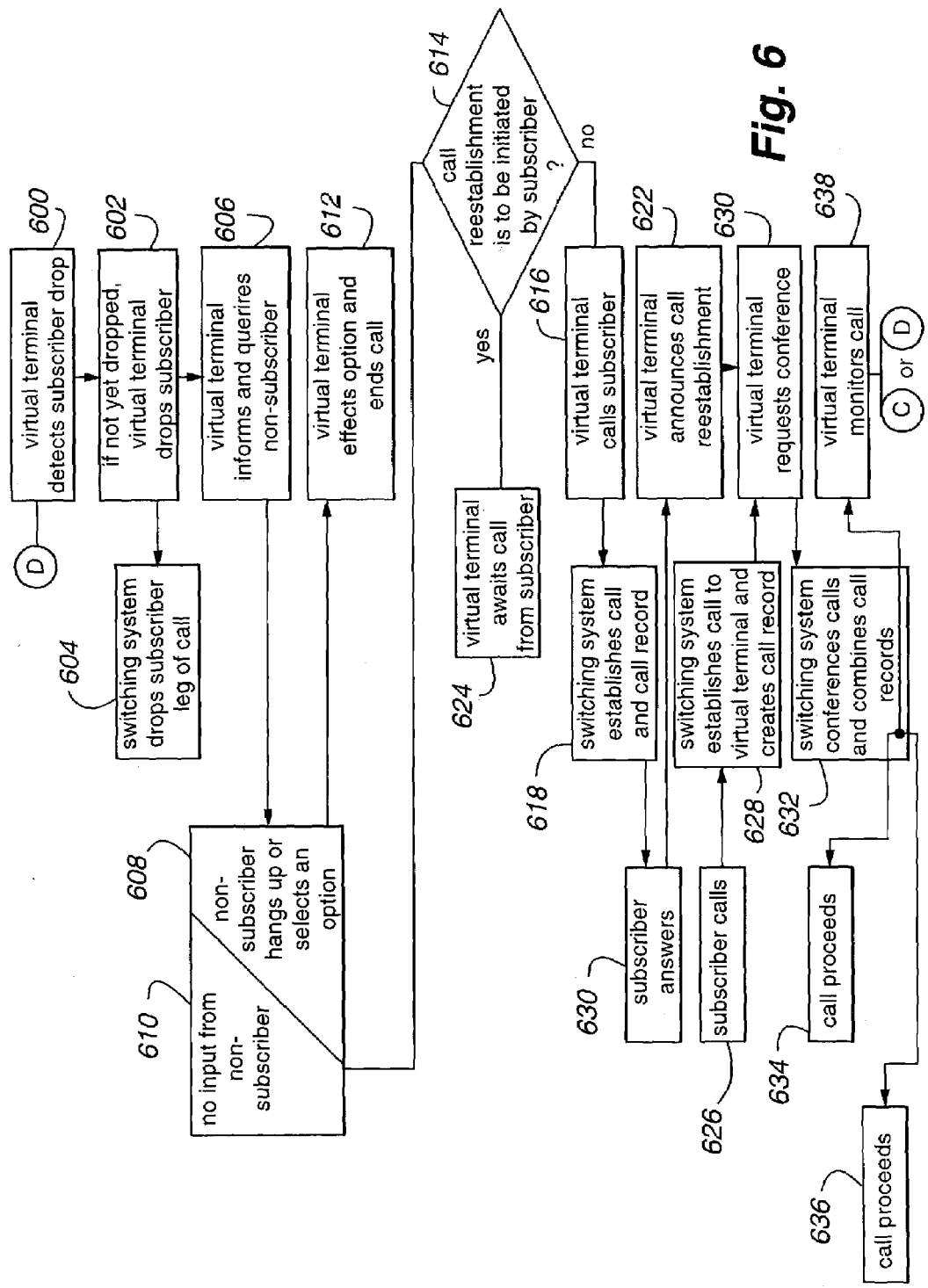
FIG. 6 is a functional block diagram of call continuation to a dropped subscriber.

If the mapped virtual terminal detects that the subscriber is being dropped from the conference call but that the non-subscriber party has stayed on the call (has not hung up), at step 600 of FIG. 6, it causes switching system 100 to drop the subscriber's portion of the conference call if it has not been dropped already, at step 602, and switching system 100 does so, at step 604. The mapped virtual terminal then informs the other party that the subscriber has been dropped and that the call is being reestablished, at step 606. Optionally, the mapped virtual terminal may also query the other party for other desired options. For example, instead of waiting for call reestablishment, the other party may wish to be transferred to the subscriber's voice-mail mailbox or to a third party such as the subscriber's secretary or colleague. If the party either selects one of these options or hangs up, the mapped terminal aborts the attempt at call reestablishment and effects the selected option if one was selected, and ends the call, at step 612. Optionally, at the subscriber's choice the mapped terminal calls the subscriber back to inform the subscriber of the call's disposition. If the party merely stays on the call to await call reestablishment, at step 610, function 126 checks, at step 614, the translations of the mapped virtual terminal 152-154 to determine if call reestablishment is to be initiated by it or by the subscriber, and if by it, to what telephone number. If the call reestablishment is to be initiated by the mapped virtual terminal, the mapped virtual terminal places a call to the subscriber at the number specified by the translations, at step 616. Switching system 100 establishes the call and a call record therefor, at step 618. When the subscriber answers, at step 620, the mapped virtual terminal informs the subscriber that this is a reestablishment of the previous call, at step 622.

Returning to step 614, if the call reestablishment is to be initiated by the subscriber, the mapped virtual terminal awaits receipt of a call from the subscriber to the telephone number that is associated with the mapped virtual terminal 152-154, at step 624. The subscriber may place that call from any terminal 102-114, be it the same terminal or a different terminal than the one whose connection was dropped. When the subscriber places the call, at step 626, switching system establishes the call to the mapped virtual terminal and creates a call record for the call, at step 628.

Following step 622 or 628, there are two calls connected to the mapped virtual terminal 152-154: the first call between the non-subscriber party and the mapped virtual terminal, and the second call between the subscriber and the mapped virtual terminal. The mapped virtual terminal now commands switching system 100 to combine (e.g., conference) the two calls into one, at step 630. Switching system 100 does so and combines the two calls' call records into one, at step 632. The conferenced calls again form two legs of a single, conference, call that connects the two parties, and this call proceeds between them, at steps 634 and 636. Being a part of the conference, the mapped virtual terminal 152-154 monitors the conference call, at step 638.

Figure 5:
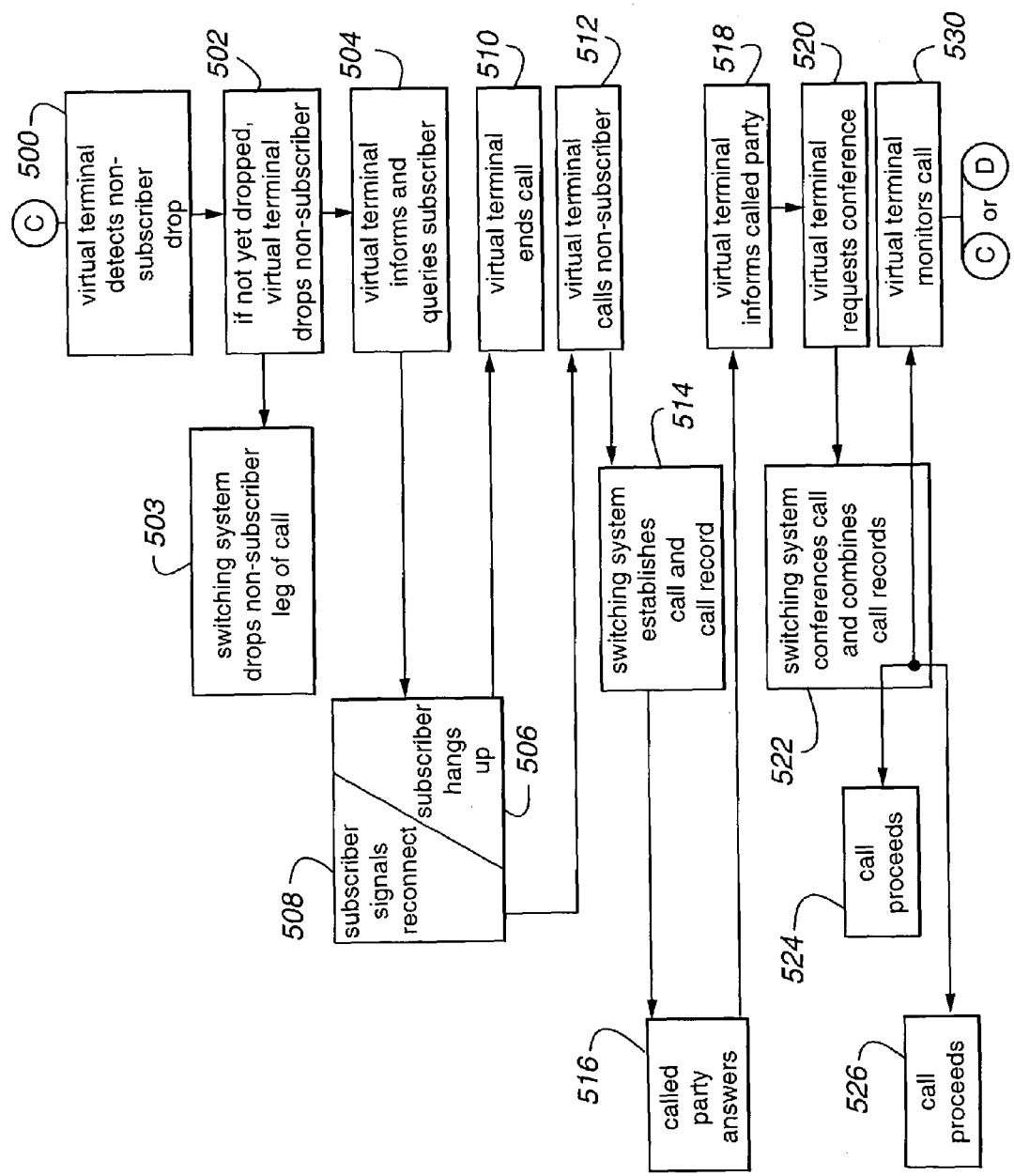
FIG. 5 is a functional block diagram of call continuation to a dropped non-subscriber.

Optionally, if the mapped virtual terminal detects that both parties have dropped from the call, and the call has a "persistent connection" feature active, the mapped terminal reestablishes the call to both parties by effecting the procedures of FIGS. 5 and 6 in parallel.

Of course, various changes and modifications to the illustrative embodiment described above will be apparent to those skilled in the art. For example, application of the invention is not limited to conventional, circuit-switched, calls, but extends to other types of communications as well, such packet-switched (VoIP) calls. Or, the invention may be used in a hybrid mode: for example, when GPRS supports both simultaneous voice and data, the control information could be sent via a GPRS data connection and the voice (bearer) delivered via traditional cellular technology. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of reestablishing a communications connection, comprising:
   associating terminal translations of a communication terminal of one of a first party and a second party, with a communication virtual terminal;
   associating the communication virtual terminal with a first communication connection between the first party and the second party;
   detecting that the first party is dropped from the first connection;

in response to the detecting, establishing a second communication connection between the first party and the virtual terminal;
combining the first and the second communication connections to reestablish a communication connection between the first party and the second party; and
associating contents of a call record of the first connection with the reestablished connection.

2. The method of claim 1 wherein:
the first communication connection exists between the first party at a first call address and the second party;
establishing comprises
determining a second call address of the first party other than the first call address; and
establishing the second communication connection to the first party at the second call address.

3. The method of claim 2 wherein:
the first call address is an address for wireless communications-connections of the first party; and
the second call address is an address for wired communications-connections of the first party.

4. The method of claim 2 wherein:
detecting that a first party is dropped comprises
determining that a wireless connection to the first party is dropped; and
establishing the second communication connection comprises
establishing a wired said second communication connection to the first party.

5. The method of claim 1 wherein:
the combining is initiated by the first party.

6. The method of claim 5 wherein:
the first communication connection is a voice call connection; and
the establishing is effected via a data connection from the first party.

7. The method of claim 1 wherein:
associating contents comprises
combining a call record of the first communication connection with a call record of the reestablished communication connection into a new call record of the reestablished communication connection.

8. The method of claim 1 wherein:
detecting that a first party is dropped comprises
determining that a portion of the first communication connection with the first party either has been dropped or is being dropped.

9. The method of claim 1 wherein:
either the first party or the second party comprises equipment that automatically interacts with another of the second party and the first party;
the call record of the first communication connection comprises a context of the equipment at a point in time when the first party is dropped; and
associating contents of a call record comprises
automatically restoring the context of the equipment.

10. The method of claim 9 wherein:
the context of the equipment comprises
a position of said another party in a call queue of the equipment.

11. The method of claim 1 wherein:
the first communication connection comprises one of a wired and a wireless connection to the first party, and
the reestablished communication connection comprises another of the wired and the wireless connection to the first party.

12. The method of claim 1 wherein:
the second party comprises a customer contact center,
the call record of the first communication connection comprises an indication of a position of the first party in a contact queue of the customer contact center at a point in time when the first party is dropped; and
establishing comprises
automatically restoring the position of the first party in the contact queue.

13. The method of claim 1 wherein:
detecting comprises
announcing to the second party that the first party has been dropped; and
giving the second party a choice of establishing a communication connection either to the first party or to a third party; and
establishing comprises
in response to the second party selecting to establish the communication connection to the first party, establishing the second communication connection to the first party; and
in response to the second party selecting to establish the communication connection to the third party, establishing a communication connection between the second party and the third party.

14. The method of claim 13 wherein:
the third party comprises a messaging system mailbox.

15. The method of claim 1 wherein:
the second party comprises
a conference of a plurality of parties.

16. The method of claim 1 further comprising the initial steps of:
one of the parties contacting the virtual terminal; and
the one of the parties having the first communication connection established to the one of the parties through the virtual terminal, in response to the contacting.

17. The method of claim 1 further comprising:
the first party signaling, via a user communications instrument of the first party that is connected to the first communication connection, that the first party is dropping from the call; wherein
detecting comprises
detecting the signaling.

18. The method of claim 1 wherein:
mapping comprises
associating terminal transactions of a communication terminal of
the one of the first and the second parties with the virtual terminal.

19. The method of claim 1 wherein:
the establishing is initiated by the second party.

20. The method of claim 1 wherein:
the establishing is initiated by the virtual terminal.

21. The method of claim 1 wherein:
the first connection comprises
a connection between the first party and the virtual terminal, and
a connection between the second party and the virtual terminal.

22. A method of reestablishing a communication connection, comprising:
associating terminal translations of a communication terminal of one of a first party and a second party with a communication virtual terminal;
establishing a first communication connection between a first party and a communication virtual terminal;

establishing a second communication connection between the virtual terminal and a second party;

combining the first and the second connections to establish a third communication connection between the first and the second parties;

monitoring the third connection by the virtual terminal;

detecting by the monitoring that one of the first and the second parties is dropped from the third connection;

establishing a fourth communication connection between the virtual terminal and the one party;

combining the fourth connection with the connection between the virtual terminal and the other of the first and the second parties to reestablish a communication connection between the first and the second parties; and associating contents of a call record of the third connection with the reestablished connection.

23. The method of claim 22 wherein:
the third connection exists between the one party at a first address and the other party; and
establishing a fourth communication connection comprises
determining a second address of the one party, and
establishing the fourth connection between the virtual terminal and the one party at the second address.

24. The method of claim 22 wherein:
the first address is an address for wireless communication-connections of the one party; and
the second address is an address for wired communication-connections of the one party.

25. The method of claim 21 wherein:
detecting comprises
determining that a wireless portion of the third communication connection to the one party is dropped; and
establishing a fourth communication connection comprises
establishing a wired connection to the one party.

26. The method of claim 21 wherein:
the reestablishing is initiated by the one party.

27. The method of claim 26 wherein:
the third connection is for a voice call; and
the reestablishing is effected via a data connection from the other party.

28. The method of claim 21 wherein:
associating comprises
combining a call record of the third connection with a call record of the fourth connection into a new call record of the reestablished connection.

29. The method of claim 21 wherein:
detecting that one of the parties is dropped comprises
determining that the connection between the virtual terminal and the one party either has been dropped or is being dropped.

30. The method of claim 21 wherein:
either the first party or the second party comprises equipment that automatically interacts with another of the first party and the second party;
the call record of the third connection comprises a context of the equipment at a point in time when the one party is dropped; and
associating comprises
automatically restoring the context of the equipment.

31. The method of claim 30 wherein:
the context of the equipment comprises
a position of one of the parties in a contact queue of the equipment.

32. The method of claim 21 wherein:
the first or the second connection comprises one of a wired and a wireless connection to the one party; and
the fourth connection comprises another of the wired and a wireless connection to the one party.

33. The method of claim 21 wherein:
the other party comprises a customer contact center;
the call record of the third connection comprises an indication of a position of the one party in a context queue of the customer contact center at a point in time when the one party is dropped; and
associating comprises
automatically restoring the position of the one party in the contact queue.

34. The method of claim 21 wherein:
establishing the fourth communication connection comprises
announcing to the other party that the one party has been dropped;
giving the other party a choice of establishing a communication connection either to the one party or to a third party;
in response to the other party selecting to establish the communication connection to the one party, establishing the fourth communication connection to the one party; and
in response to the other party selecting to establish the communication connection to the third party, establishing a fifth communication connection between the other party and the third party.

35. The method of claim 34 wherein:
the third party comprises a messaging system mailbox of the one party.

36. The method of claim 21 wherein:
the other party comprises
a conference of a plurality of parties.

37. An apparatus for performing the method of one of claims 2-17, 24-36, or 1-22.

38. A computer-readable medium containing instructions which, when executed in a computer, cause the computer to perform the method of one of claims 2-17, 24-36, or 1-22.

39. An apparatus for reestablishing a communication connection comprising:
a communication virtual terminal associated with a first communication connection between a first party and a second party, the communication virtual terminal having terminal translations of a communication terminal of one of the first party and the second party associated with the communication virtual terminal;
a detector of the first party being dropped from the first connection;
an establisher of a second communication connection between the first party and the second party;
a combiner of the first and the second communication connections for reestablishing a communication connection between the first party and the second party: and
an associator of contents of a call record of the first communication connection with the reestablished communication connection.

40. The apparatus of claim 39 wherein:
the first communication connection exists between the first party at a first call address and the second party;
the determinator is adapted to determine a second call address of the first party other than the first call address; and the establisher is adapted to establish the second communication connection to the first party at the second call address.

41. The apparatus of claim 40 wherein:
the first call address is an address for wireless communications-connections of the first party; and
the second call address is an address for wired communications-connections of the first party.

42. The apparatus of claim 40 wherein:
the detector is adapted to detect that a wireless connection to the first party is dropped; and
the establisher is adapted to establish a wired said second communication connection to the first party.

43. The apparatus of claim 39 wherein: operation of the combiner is initiated by the first party.

44. The apparatus of claim 39 wherein:
the associator is adapted to combine a call record of the first communication connection with a call record of the reestablished communication connection into a new call record of the reestablished communication connection.

45. The apparatus of claim 39 wherein:
the detector is adapted to detect that a portion of the first communication connection with the first party either has been dropped or is being dropped.

46. The apparatus of claim 39 wherein:
either the first party or the second party comprises equipment that automatically interacts with another of the second party and the first party;
the call record of the first communication connection comprises a context of the equipment at a point in time when the first party is dropped; and
the associator is adapted to automatically cause the context of the equipment to be restored.

47. The apparatus of claim 46 wherein:
the context of the equipment comprises
a position of said another party in a call queue of the equipment.

48. The apparatus of claim 39 wherein:
the first communication connection comprises one of a wired and a wireless connection to the first party, and
the establisher is adapted to establish another of the wired and the wireless connection to the first party.

49. The apparatus of claim 39 wherein:
the second party comprises a customer contact center,
the call record of the first communication connection comprises an indication of a position of the first party in a contact queue of the customer contact center at a point in time when the first party is dropped; and
the associator is adapted to automatically cause the position of the calling party in the contact queue to be restored.

50. The apparatus of claim 39 further comprising:
an interactor with the second party that is adapted to announce to the second party that the first party has been dropped and give the second party a choice of establishing a communication connection either to the first party or to a third party; and wherein
the establisher is adapted to establish the communication connection selected by the second party.

51. The apparatus of claim 50 wherein:
the third party comprises a messaging system mailbox.

52. The apparatus of claim 39 wherein:
the second party comprises
a conference of a plurality of parties.

53. The apparatus of claim 39 wherein:
the establisher is adapted to establish the first communication connection to the one of the parties through the virtual terminal in response to the virtual terminal being contacted by one of the parties.

54. The apparatus of claim 39 further comprising:
the detector comprises
a detector of the first party signaling, via a user communications instrument of the first party that is connected to the first communication connection, that the first party is dropping from the call.

55. The apparatus of claim 39 wherein:
operation of the combiner is initiated by the second party.

56. The apparatus of claim 39 wherein:
operation of the combiner is initiated by the virtual terminal.

57. The apparatus of claim 39 wherein:
the first connection comprises
a connection between the first party and the virtual terminal, and
a connection between the second party and the virtual terminal.

58. An apparatus for reestablishing a communication connection, comprising:
a virtual terminal for monitoring a third communication connection to detect a party dropping from the third connection;
a mapper of the virtual terminal to one of a first party and a second party, the mapper being adapted to associate terminal translations of a communication terminal of the one of the parties with the virtual terminal;
an establisher of communication connections for establishing a first communication connection between the virtual terminal and the first party and a second communication connection between the virtual terminal and the second party;
a combiner of the first and the second connections to establish the third connection between the first and the second parties; wherein
the establisher is adapted to respond to detection by the virtual terminal of one of the first and second parties dropping from the third connection by establishing a fourth communication connection between the virtual terminal and the one party, and
the combiner is adapted to combine the fourth connection with the connection between the virtual terminal and the other of the first and the second parties to reestablish a communication connection between the first and the second parties; and
the apparatus further comprising
an associator of contents of a call record of the third connection with the reestablished connection.

59. The apparatus of claim 57 wherein:
the first address is an address for wireless communication-connections of the one party; and
the second address is an address for wired communication-connections of the one party.

60. The apparatus of claim 57 wherein:
the establisher is adapted to establish a wired connection to the one party in response to the virtual terminal detecting that a wireless portion of the third communication connection to the one party is dropped.

61. The apparatus of claim 57 wherein:
operation of the combiner is initiated by the one party.

62. The apparatus of claim 57 wherein:

the associator is adapted to cause a call record of the third connection to be combined with a call record of the fourth connection into a new call record of the reestablished connection.

63. The apparatus of claim 57 wherein:

the virtual terminal is adapted to detect that the connection between the virtual terminal and the one party either has been dropped or is being dropped.

64. The apparatus of claim 57 wherein:

either the first party or the second party comprises equipment that automatically interacts with another of the first party and the second party;

the call record of the third connection comprises a context of the equipment at a point in time when the one party is dropped; and the associator is adapted to automatically restore the context of the equipment.

65. The apparatus of claim 64 wherein:

the context of the equipment comprises a position of one of the parties in a contact queue of the equipment.

66. The apparatus of claim 57 wherein:

the first or the second connection comprises one of a wired and a wireless connection to the one party; and the establisher is adapted to establish another of the wired and a wireless connection to the one party as the fourth connection.

67. The apparatus of claim 57 wherein:

the other party comprises a customer contact center;

the call record of the third connection comprises an indication of a position of the one party in a context queue of the customer contact center at a point in time when the one party is dropped; and the associator is adapted to automatically restore the position of the one party in the contact queue.

68. The apparatus of claim 57 further comprising an interactor with the other party that is adapted to announce to the other party that the one party has been dropped and give the other party a choice of establishing a communication connection either to the one party or to a third party; and wherein the establisher is adapted to establish the communication connection selected by the other party.

69. The apparatus of claim 68 wherein:

the third party comprises a messaging system mailbox.

70. The apparatus of claim 68 wherein:

the other party comprises a conference of a plurality of parties.

71. The apparatus of claim 58 wherein:

the third connection exists between the one party at a first address and the other party;

the virtual terminal is adapted to determine a second address of the one party; and the establisher is adapted to establish the fourth connection between the virtual terminal and the one party at the second address.

72. The apparatus of claim 58 wherein:

operation of the combiner is initiated by the second party.

73. The apparatus of claim 58 wherein:

operation of the combiner is initiated by the virtual terminal.

* * * * *